(12) United States Patent
Lee

(10) Patent No.: US 10,961,739 B2
(45) Date of Patent: Mar. 30, 2021

(54) CEILING TYPE SEISMIC IMPACT BUFFER UNIT

(71) Applicant: An Se Lee, Cheongju-si (KR)

(72) Inventor: An Se Lee, Cheongju-si (KR)

(*) Notice: Subject to any disclaimer, the term of this patent is extended or adjusted under 35 U.S.C. 154(b) by 0 days.

(21) Appl. No.: 16/789,616

(22) Filed: Feb. 13, 2020

(65) Prior Publication Data

US 2020/0362557 A1    Nov. 19, 2020

(30) Foreign Application Priority Data

May 14, 2019    (KR) .................... 10-2019-0056047

(51) Int. Cl.
*E04H 9/02*        (2006.01)
*E04B 9/04*        (2006.01)
*E04B 9/18*        (2006.01)
*F16F 15/067*      (2006.01)
*E04B 9/20*        (2006.01)
*E04B 9/24*        (2006.01)
*E04B 9/30*        (2006.01)

(52) U.S. Cl.
CPC ............. *E04H 9/0215* (2020.05); *E04B 9/04* (2013.01); *E04B 9/18* (2013.01); *E04B 9/20* (2013.01); *F16F 15/067* (2013.01); *E04B 9/241* (2013.01); *E04B 9/30* (2013.01); *E04B 2009/186* (2013.01)

(58) Field of Classification Search
CPC ... E04H 9/0215; E04B 9/18; E04B 2009/186; E04B 9/20; E04B 9/241; E04B 9/30; E04B 9/04; F16F 15/067; F16F 1/128; E16F 15/06

USPC .. 52/167.1, 167.4, 167.6, 167.7, 167.8, 705, 52/39; 248/323, 327, 330.1, 613, 565
See application file for complete search history.

(56) References Cited

U.S. PATENT DOCUMENTS 1,982,565 A * 11/1934 Barge ................... E04B 9/18
                                                52/346
2,024,961 A * 12/1935 Barge ................... E04B 9/18
                                                52/346
2,051,778 A *  8/1936 Venzie .................. E04B 9/18
                                                52/346

(Continued)

FOREIGN PATENT DOCUMENTS

KR    20-0182650 Y1    5/2000
KR    10-1274568 B1    6/2013

(Continued)

*Primary Examiner* — Brent W Herring
(74) *Attorney, Agent, or Firm* — Novick, Kim & Lee, PLLC; Jae Youn Kim

(57) ABSTRACT

Disclosed is a ceiling type seismic impact buffer unit which may perform a buffering action of reducing vibration or the impact applied thereto attributable to earthquakes, typhoons, etc. without direct transmission of the vibration or the impact to a ceiling panel installed on a ceiling. The ceiling type seismic impact buffer unit includes a housing main body, a first coupling bolt, which is fixed into a coupling hole formed in the center of the upper surface of the housing main body and has a front end connected to an upper connection rod, a second coupling bolt, which is fixed to a sliding contactor through a sliding guide hole formed in the center of the lower surface of the housing main body and has a front end connected to a lower connection rod, and a restoring spring, which has upper and lower ends coupled to first and second fixing washers.

5 Claims, 5 Drawing Sheets

(56) References Cited

U.S. PATENT DOCUMENTS

| | | | | |
|---|---|---|---|---|
| 2,335,834 | A | * | 11/1943 | Wood ................. F16L 3/217 |
| | | | | 248/565 |
| 2,389,562 | A | * | 11/1945 | Storch ............... F16F 3/0876 |
| | | | | 248/613 |
| 2,950,576 | A | * | 8/1960 | Rubenstein ........... E04B 1/383 |
| | | | | 52/223.13 |
| 3,650,498 | A | * | 3/1972 | Deak ................... F16F 1/12 |
| | | | | 248/575 |
| 3,769,774 | A | * | 11/1973 | Barnes ................ F16L 3/14 |
| | | | | 52/698 |
| 3,831,894 | A | * | 8/1974 | Newton, II ........... F21V 21/34 |
| | | | | 248/327 |
| 3,843,080 | A | * | 10/1974 | Imai .................. F16L 3/14 |
| | | | | 248/58 |
| 4,934,650 | A | * | 6/1990 | LeKuch .............. F16L 55/035 |
| | | | | 248/60 |
| 5,730,410 | A | * | 3/1998 | Archambault ...... F16M 11/2014 |
| | | | | 105/150 |
| 7,028,432 | B2 | * | 4/2006 | Manos ................ E04B 9/18 |
| | | | | 248/343 |
| 8,342,469 | B2 | * | 1/2013 | Wang ............... A61B 6/4429 |
| | | | | 248/323 |
| 9,188,184 | B2 | * | 11/2015 | Adoline ............... F16F 3/04 |
| D777,015 | S | * | 1/2017 | Deveci ................ D8/354 |
| 2004/0216398 | A1 | * | 11/2004 | Manos ................ E04B 9/18 |
| | | | | 52/167.1 |
| 2005/0006833 | A1 | * | 1/2005 | Hsieh ................ F16F 1/127 |
| | | | | 267/166 |
| 2013/0300044 | A1 | * | 11/2013 | Adoline .............. F16F 1/128 |
| | | | | 267/168 |
| 2017/0261130 | A1 | * | 9/2017 | Bernert ............... F16F 1/04 |

FOREIGN PATENT DOCUMENTS

| | | |
|---|---|---|
| KR | 10-1830827 B1 | 3/2018 |
| KR | 10-1870068 B1 | 6/2018 |

\* cited by examiner

CEILING TYPE SEISMIC IMPACT BUFFER UNIT

BACKGROUND OF THE INVENTION

Field of the Invention

The present invention relates to a ceiling type seismic impact buffer unit, and more particularly to a ceiling type seismic impact buffer unit which, even when vibration or impact is applied to a building attributable to earthquakes, typhoons, etc., may reduce the vibration or the impact without direct transmission of the vibration or the impact to a ceiling panel installed on a ceiling so as to maintain the firmly fixed state of a ceiling structure and to prevent damage to the ceiling structure through such a buffering action.

Description of the Related Art

In general, a plurality of ceiling panels is constructed to shield the ceiling of a building so as to hide the poor appearance of the ceiling on which various structures, such as various wires, ventilation ducts, etc., are installed due to electric works, or a ceiling panel configured to shield the ceiling is installed to prevent contaminated air from the outside from being introduced into the building or to create a comfortable and cozy indoor atmosphere.

As such, when a ceiling panel is installed on the ceiling, the upper end of a connection rod is vertically connected to an anchor bolt fixed to a ceiling slab, and the lower end of the connection rod is connected to the ceiling panel so as to support the ceiling panel.

However, since the ceiling panel is supported by the connection rod connected to the anchor bolt of the ceiling slab and is thereby vertically fixed, if vibration or strong impact attributable to natural disasters, such as earthquakes or typhoons, is applied to a building, the vibration or the impact is applied to the ceiling panel fixed to the ceiling, the ceiling panel is strongly shaken in the lateral direction, and ceiling structures installed on the ceiling panel are separated from the ceiling panel or damaged and thus fall on the indoor floor, thereby causing danger of accidents or loss of lives.

RELATED ART DOCUMENT

Patent Document (Patent Document 1) KR 10-1830827
(Patent Document 2) KR 10-1274568
(Patent Document 3) KR 10-1870068
(Utility Model Document 4) KR 20-0182650

SUMMARY OF THE INVENTION

Therefore, the present invention has been made in view of the above problems, and it is an object of the present invention to provide a ceiling type seismic impact buffer unit which connects an upper connection rod vertically coupled to an anchor bolt of a ceiling slab, and a lower connection rod coupled to a ceiling panel so as to hang the ceiling panel attached thereto to support the ceiling panel, so that the ceiling type seismic impact buffer unit performs a buffering action, and thus, even if vibration or strong impact attributable to natural disasters, such as earthquakes or typhoons, is applied to a building and the vibration or the impact is transmitted to the upper connection rod vertically coupled to the anchor bolt of the ceiling slab, allows the lower connection rod coupled to the ceiling panel to prevent ceiling structures installed on the ceiling panel from being separated from the ceiling panel or damaged through the buffering action of reducing the vibration or the impact.

In accordance with the present invention, the above and other objects can be accomplished by the provision of a ceiling type seismic impact buffer unit configured to connect an upper connection rod, vertically coupled to an anchor bolt of a ceiling slab, and a lower connection rod, coupled to a ceiling panel, to each other, the ceiling type seismic impact buffer unit including a housing main body including upper and lower housings aligned with and connected to each other to form an inner space therein, a first coupling bolt configured to be fixed into a coupling hole formed in an exact center of an upper surface of the housing main body and to have a front end connected to the upper connection rod, a second coupling bolt configured to pass through a sliding guide hole formed in an exact center of a lower surface of the housing main body, to be fixed to a sliding contactor installed inside the sliding guide hole and to have a front end connected to the lower connection rod, and a restoring spring configured to be elastically supported and to have upper and lower ends coupled to first and second fixing washers of the first and second coupling bolts located inside the housing main body so that the second coupling bolt is placed on a central vertical line of the housing main body by the restoring spring.

The upper and lower housings of the housing main body may be provided in a cap shape such that upper and lower horizontal surfaces of the upper and lower housing are placed at corresponding positions, have different diameters and be coupled to each other by insertion so as to overlap each other to thus form the inner space therein, and fixing pins may be inserted into overlapping parts of the upper and lower housings so as to fix the upper and lower housings.

The coupling hole may be formed in the exact center of the upper surface of the housing main body, the first coupling bolt may be fixed into the coupling hole so as to protrude upwards from the upper surface of the housing main body, and the upper connection rod may be connected to the first coupling bolt so as to be vertically coupled to the anchor bolt of the ceiling slab.

The sliding guide hole having a concentric circular shape may be formed in the exact center of the lower surface of the housing main body, and an annular support protrusion configured to be bent upwards may be formed along a circumference of the sliding guide hole so that a sliding bearing is coupled to the annular support protrusion by insertion.

The sliding bearing may be coupled to an outer circumferential surface of the annular support protrusion and be provided with balls protruding upwards and downwards from the sliding bearing, the sliding contactor may contact upper surfaces of the balls of the sliding bearing so as to slide in a lateral direction and be provided with an annular prop protrusion, and the second coupling bolt may be coupled to a center of the sliding contactor, pass through the sliding guide hole, protrude downwards from the lower surface of the housing main body and be connected to the lower connection rod.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
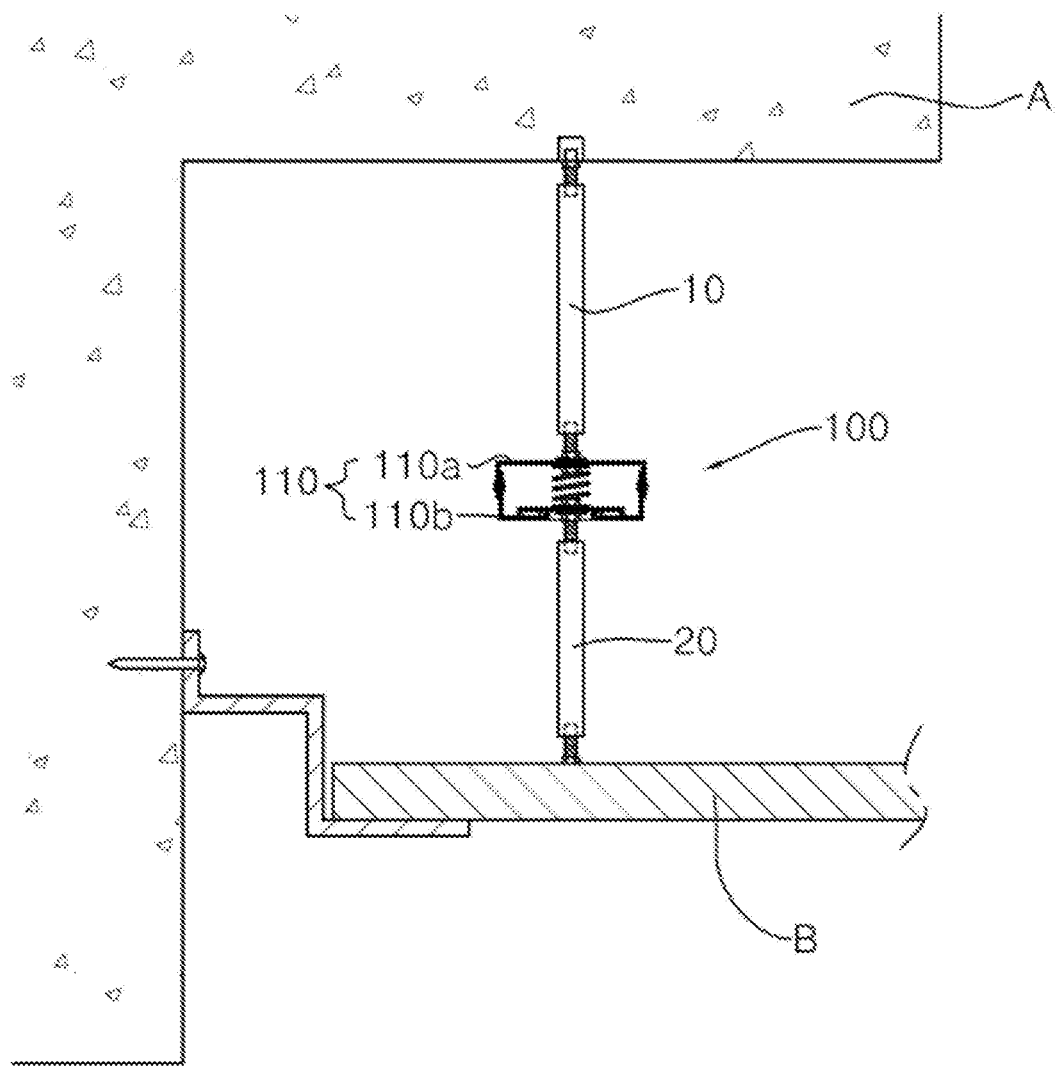
FIG. 1 is a front view schematically illustrating a ceiling type seismic impact buffer unit according to the present invention in an installed state.

Hereinafter, reference will now be made in detail to the preferred embodiments of the present invention, examples of which are illustrated in the accompanying drawings. In the following description of the present invention, a detailed description of known functions and configurations incorporated herein will be omitted when it may make the subject matter of the present invention rather unclear.

In the present invention, an upper connection rod 10 is vertically coupled to an anchor bolt of a ceiling slab A, a ceiling panel B is coupled to a lower connection rod 20 so as to be hung thereon to be supported, and the upper and lower connection rods 10 and 20 are connected to each other by a ceiling type seismic impact buffer unit 100 so that the ceiling type seismic impact buffer unit 100 performs an action of buffering the impact applied to the ceiling panel B.

The ceiling type seismic impact buffer unit 100 includes a housing main body 110 which includes upper and lower housings 110a and 110b aligned with and connected to each other to form an inner space therein, a first coupling bolt 140 which is fixed into a coupling hole 120 formed in the exact center of the upper surface of the housing main body 110 and has a front end connected to the upper connection rod 10, a second coupling bolt 150 which passes through a sliding guide hole 130 formed in the exact center of the lower surface of the housing main body 110, is fixed to a sliding contactor 170 installed inside the sliding guide hole 130 and has a front end connected to the lower connection rod 20, and a restoring spring 180 which is elastically supported and has upper and lower ends coupled to first and second fixing washers 142 and 152 of the first and second coupling bolts 140 and 150 located inside the housing main body 110 so that the second coupling bolt 150 may be placed on a central vertical line of the housing main body 110 by the restoring spring 180.

The upper and lower housings 110a and 110b of the housing main body 110 are provided in a cap shape such that upper and lower horizontal surfaces of the upper and lower housing 110a and 110b are placed at corresponding positions, have different diameters, and are coupled to each other by insertion so as to overlap each other to thus form the inner space therein, and fixing pins 112 are inserted into overlapping parts of the upper and lower housings 110a and 110b so as to fix the upper and lower housings 110a and 110, thus forming the housing main body 110.

The coupling hole 120 is formed in the exact center of the upper surface of the housing main body 110, the first coupling bolt 140 is fixed into the coupling hole 120 so as to protrude upwards from the upper surface of the housing main body 110, and the upper connection rod 10 is connected to the first coupling bolt 140 and thereby vertically coupled to the anchor bolt of the ceiling slab A.

The sliding guide hole 130 having a concentric circular shape is formed in the exact center of the lower surface of the housing main body 110, the housing main body 110 may slide in the lateral direction along the sliding guide hole 130 based on the second coupling bolt 150 which passes through the sliding guide hole 130 and is fixed to the sliding contactor 170, and an annular support protrusion 132 which is bent upwards may be formed along the circumference of the sliding guide hole 130 so that a sliding bearing 160 may be coupled to the annular support protrusion 132 by insertion.

The sliding bearing 160 is coupled to the outer circumferential surface of the annular support protrusion 132 and provided with balls protruding upwards and downwards from the sliding bearing 160, the sliding contactor 170 contacts the upper surfaces of the balls of the sliding bearing 160 so as to slide in the lateral direction and is provided with an annular prop protrusion 172, and the second coupling bolt 150, which is coupled to the center of the sliding contactor 170, passes through the sliding guide hole 130 and protrudes downwards from the lower surface of the housing main body 100, is connected to the lower connection rod 20.

Since the lower connection rod 20 connected to the front end of the second coupling bolt 150 is coupled to the ceiling panel B, as described above, even if vibration or impact is transmitted to the housing main body 110, which is coupled to the ceiling slab A by the upper connection rod 10 and is fixed to the first coupling bolt 140, the second coupling bolt 150 fixed to the sliding contactor 170 may perform a buffering action of reducing the vibration or the impact due to the sliding action of the sliding contactor 170.

Further, the first fixing washer 142 of the first coupling bolt 140, which is fixedly coupled to the coupling hole 120 formed through the upper surface of the housing main body 110, the second fixing washer 152 of the second coupling bolt 150, which is fixedly coupled to the sliding contactor 170 through the sliding guide hole 130 formed through the lower surface of the housing main body 110, are provided, and the first and second coupling bolts 140 and 150 are elastically supported on the central vertical line of the housing main body 110 by the restoring spring 180, the upper and lower ends of which are inserted into the first and second fixing washers 142 and 152, thereby allowing the second coupling bolt 150 to be placed on the central vertical line of the housing main body 110.

Even if the housing main body 110, which is coupled to the ceiling slab A by the upper connection rod 10 and is fixed to the first coupling bolt 140, is moved laterally by vibration or impact, the lower connection rod 20, which is connected to the front end of the second coupling bolt 150, is not moved laterally on the ceiling panel B due to the sliding action of the sliding contactor 170 but the restoring spring 170 fixed to the second coupling bolt 150 is twisted and then performs a restoring function of moving the second coupling bolt 150 to the exact central position of the lower surface of the housing main body 110.

An embodiment of the ceiling type seismic impact buffer unit 100 according to the present invention will be described in detail with reference to the accompanying drawings.

As shown in FIG. 1, the upper connection rod 10 is vertically coupled to the anchor bolt of the ceiling slab A, the ceiling panel B is coupled to the lower connection rod 20 so as to be hung thereon to be supported, and the upper and lower connection rods 10 and 20 are connected to each other by the ceiling type seismic impact buffer unit 100.

Figure 2:
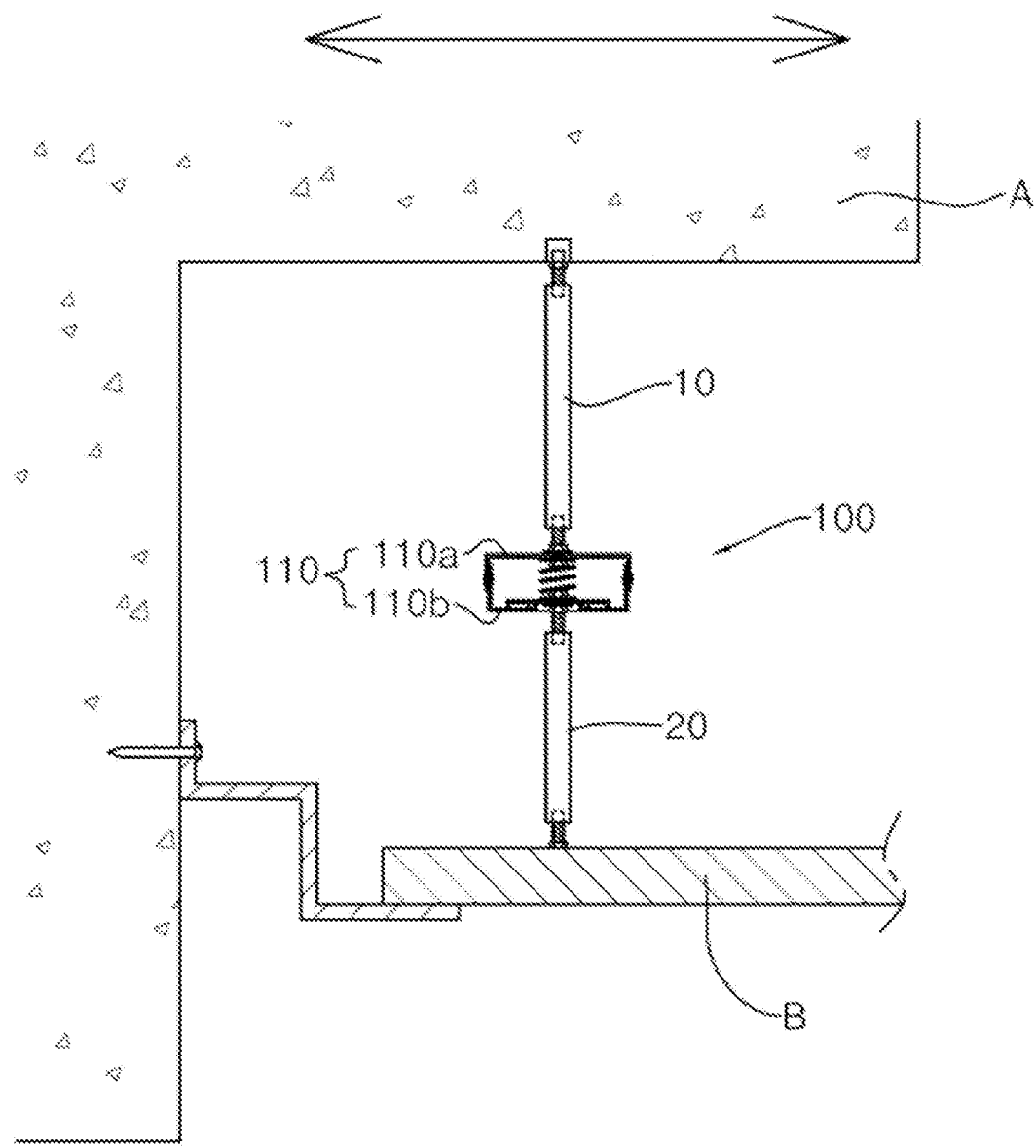
FIG. 2 is a front view schematically illustrating an impact reduced state of a ceiling panel by the ceiling type seismic impact buffer unit according to the present invention.
Figure 3:
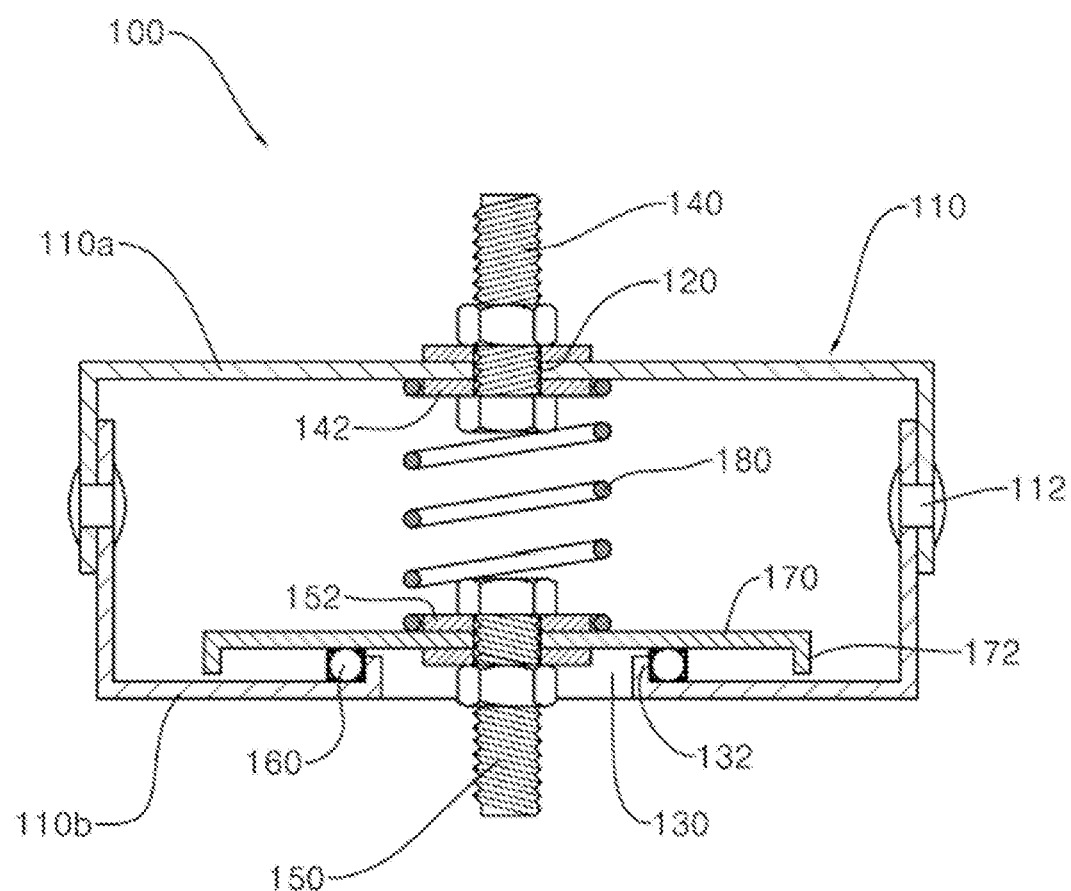
FIG. 3 is an enlarged cross-sectional view illustrating the configuration of the ceiling type seismic impact buffer unit according to the present invention.
Figure 4:
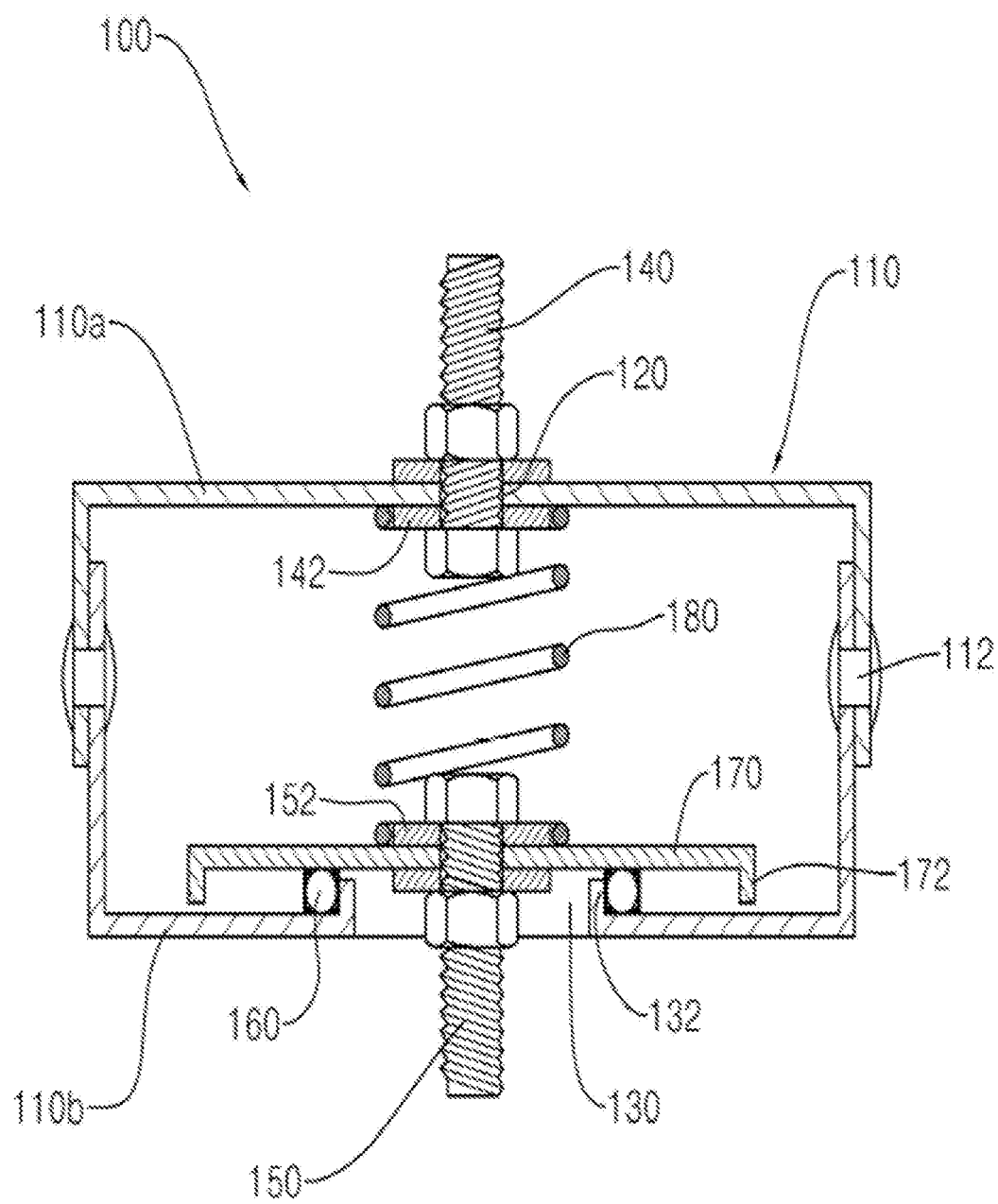
FIG. 4 is a cross-sectional view illustrating the configuration of the ceiling type seismic impact buffer unit according to the present invention.

In this state, as shown in FIG. 2, even if vibration or strong impact attributable to natural disasters, such as earthquakes or typhoons, is applied to a building and the vibration or the impact is transmitted to the upper connection rod 10 vertically coupled to the anchor bolt of the ceiling slab A, the vibration or the impact is not applied to the ceiling panel B coupled to the lower connection rod 20 and provided with ceiling structures installed thereon, and thereby, the ceiling type seismic impact buffer unit 100 configured to connect the upper and lower connection rods 10 and 20 to each other prevents separation of the ceiling structures installed on the ceiling panel B from the ceiling panel B or damage to the ceiling structures through a buffering action of reducing the vibration or the impact transmitted to the lower connection rod 20.

Figure 5:
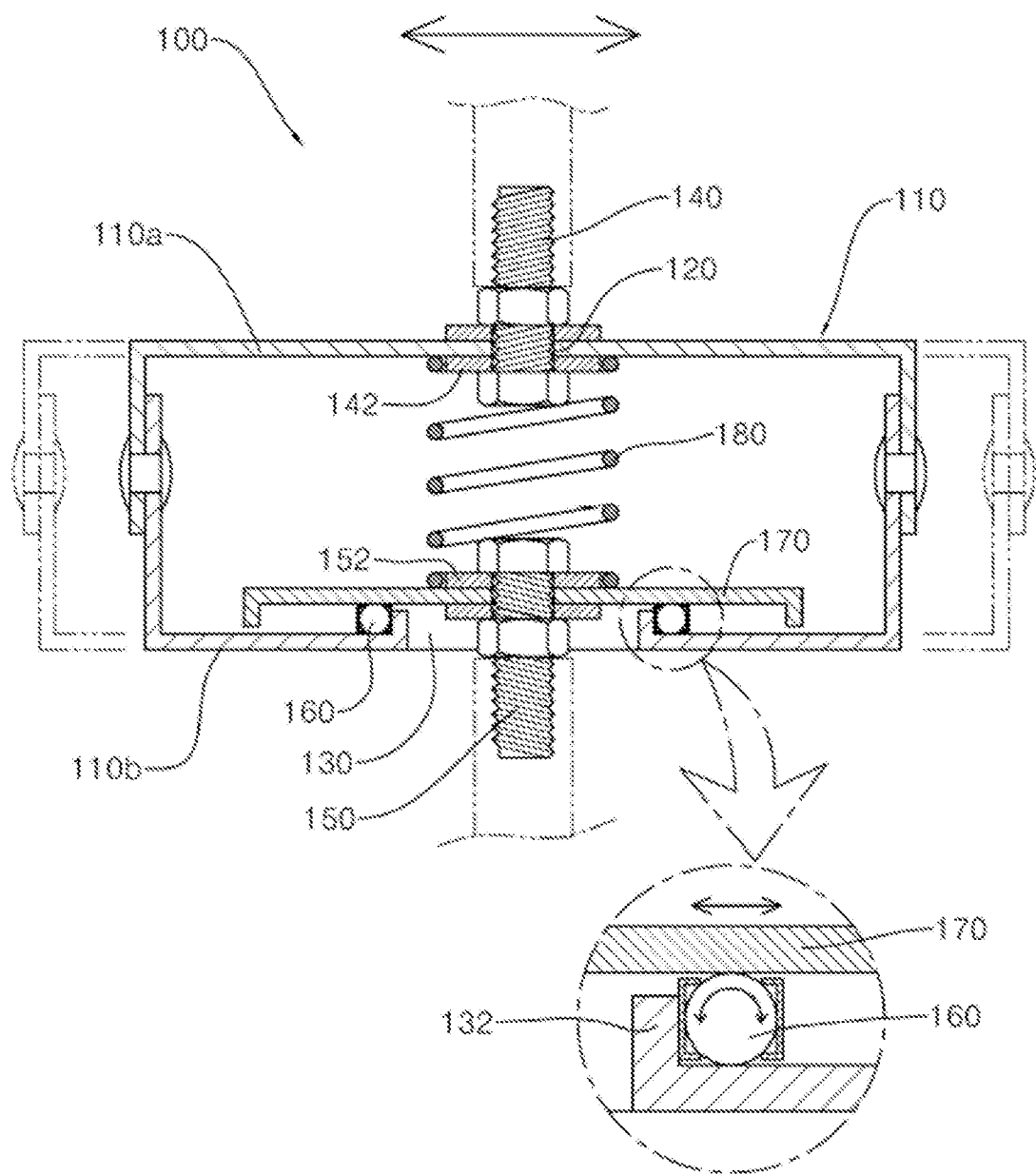
FIG. 5 is an enlarged cross-sectional view illustrating an operating state of the ceiling type seismic impact buffer unit according to the present invention.

That is, as shown in FIG. 5, in the ceiling type seismic impact buffer unit 100 according to the present invention, the first coupling bolt 140 fixed to the center of the upper surface of the housing main body 110 is coupled to the upper connection rod 10 so as to be coupled to the ceiling slab, and thus, vibration or impact applied to the ceiling slab is directly transmitted to the housing main body 110 and the housing main body 110 is shaken laterally. However, since the second coupling bolt 150 fixed to the sliding contactor 170 through the sliding guide hole 130 formed in the center of the lower surface of the housing main body 110 almost maintains a normal position thereof, the vibration or the impact is not directly transmitted to the second coupling bolt 150 and shaking of the second coupling bolt 150 is minimized due to such a buffering action.

That is, the vibration or the impact applied to the ceiling slab A is transmitted to the housing main body 110 through the first coupling bolt 140, but is not transmitted to the second coupling bolt 150 fixed to the sliding contactor 170 through the sliding guide hole 130 formed through the lower surface of the housing main body 110 so that the second coupling bolt 150 almost maintains a normal position thereof, thereby preventing separation of the ceiling structures installed on the ceiling panel B coupled to the second coupling bolt 150 or damage to the ceiling structures.

As is apparent from the above description, the present invention provides a ceiling type seismic impact buffer unit which, even when vibration or impact is applied to a building attributable to earthquakes, typhoons, etc., may reduce the vibration or the impact without direct transmission of the vibration or the impact to a ceiling panel installed on a ceiling so as to maintain the firmly fixed state of a ceiling structure installed on the ceiling panel and to prevent damage to the ceiling structure and safety accidents through such a buffering action.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A ceiling type seismic impact buffer unit configured to connect an upper connection rod vertically coupled to an anchor bolt of a ceiling slab and a lower connection rod coupled to a ceiling panel to each other, the ceiling type seismic impact buffer unit comprising:
   a housing main body comprising upper and lower housings aligned with and connected to each other to form an inner space therein;
   a first coupling bolt configured to be fixed into a coupling hole formed in a center of an upper surface of the housing main body and having a front end connected to the upper connection rod;
   a second coupling bolt configured to pass through a sliding guide hole formed in a center of a lower surface of the housing main body and to be fixed to a sliding contactor installed inside the sliding guide hole, and having a front end connected to the lower connection rod; and
   a restoring spring configured to be elastically supported and having upper and lower ends coupled to first and second fixing washers of the first and second coupling bolts located inside the housing main body so that the second coupling bolt is placed on a central vertical line of the housing main body by the restoring spring.

2. The ceiling type seismic impact buffer unit according to claim 1, wherein the upper and lower housings of the housing main body are provided in a cap shape such that upper and lower horizontal surfaces of the upper and lower housings are placed at corresponding positions, have different diameters and are coupled to each other by insertion so as to overlap each other to thus form the inner space therein, and fixing pins are inserted into overlapping parts of the upper and lower housings so as to fix the upper and lower housings.

3. The ceiling type seismic impact buffer unit according to claim 1, wherein the coupling hole is formed in the center of the upper surface of the housing main body, the first coupling bolt is fixed into the coupling hole so as to protrude upwards from the upper surface of the housing main body, and the upper connection rod is connected to the first coupling bolt so as to be vertically coupled to the anchor bolt of the ceiling slab.

4. The ceiling type seismic impact buffer unit according to claim 1, wherein the sliding guide hole having a concentric circular shape is formed in the center of the lower surface of the housing main body, and an annular support protrusion configured to be bent upwards is formed along a circumference of the sliding guide hole so that a sliding bearing is coupled to the annular support protrusion by insertion.

5. The ceiling type seismic impact buffer unit according to claim 4, wherein the sliding bearing is coupled to an outer circumferential surface of the annular support protrusion and is provided with balls protruding upwards and downwards from the sliding bearing, the sliding contactor contacts upper surfaces of the balls of the sliding bearing so as to slide in a lateral direction and is provided with an annular prop protrusion, and the second coupling bolt is coupled to a center of the sliding contactor, passes through the sliding guide hole, protrudes downwards from the lower surface of the housing main body and is connected to the lower connection rod.

* * * * *